United States Patent Office 3,364,419
Patented Jan. 16, 1968

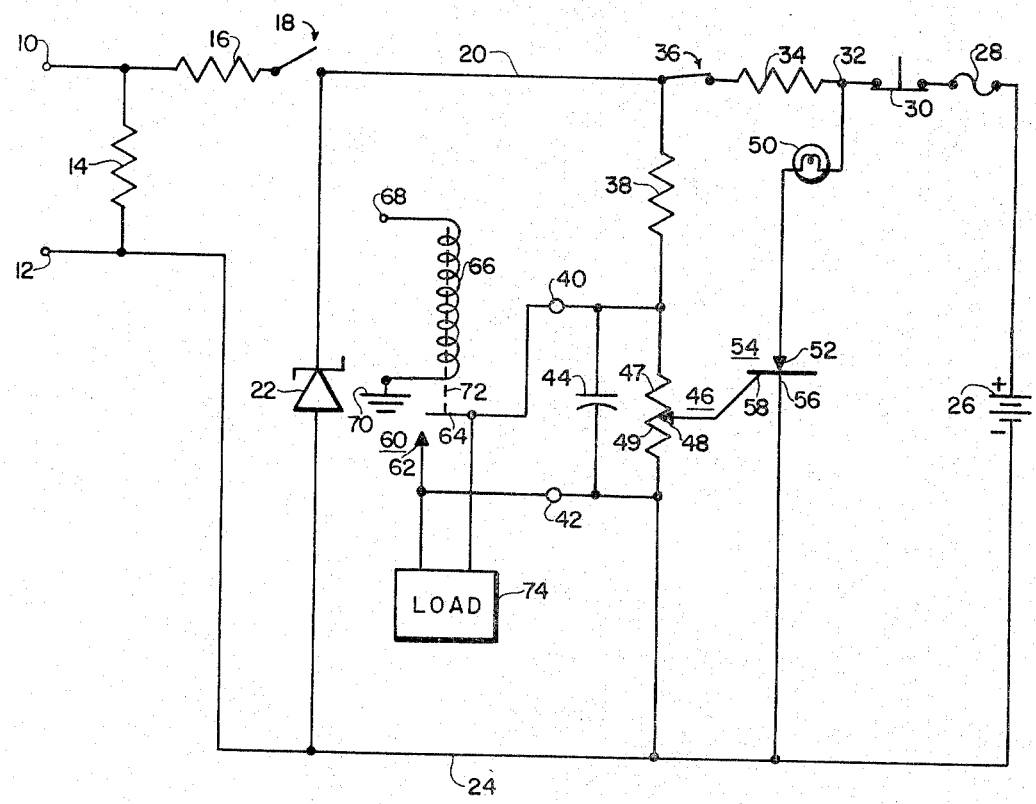

3,364,419
RELAY CONTACT CHATTER TEST CIRCUIT
Gary D. Anderson, Coon Rapids, Minn., assignor to Honeywell Inc., a corporation of Delaware
Filed Sept. 10, 1964, Ser. No. 395,430
1 Claim. (Cl. 324—28)

ABSTRACT OF THE DISCLOSURE

A testing circuit for detecting a condition which occurs for longer than a predetermined time period. The specific condition shown is for detecting the opening of relay contacts and a holding circuit for providing an indication when the contacts have opened for longer than the predetermined time.

---

This invention pertains generally to an open circuit sensor and more specifically to a contact chatter detector where the contacts are open momentarily.

Although this circuit can be used to detect most open circuits or the high impedance condition of circuits that can have either a high impedance or low impedance it is particularly useful when it is used to detect relay contact chatter. It is well known to those skilled in the art that relay contacts often will chatter or open momentarily when the relay is subjected to vibrations. In most applications this chatter is undesirable because it disrupts operation of the circuit, and it causes voltage and current transients. Usually some chatter can be tolerated if the contacts are not open too long. Therefore, a detector that detects relay contacts that are open more than a predetermined length of time is desired.

The prior art detectors used to detect relay contact chatter were usually quite complicated and cumbersome in addition to being expensive. The present invention, however, is simple and can be made small enough to hold in one hand. It is also less costly and individual units can be used to monitor separate relays, whereas, when using the prior art detectors, it is usually too expensive to have more than one detector for a test of a given set of relays.

The present invention comprises a means for providing a visible or audible output signal when a pair of contacts are open for more than a predetermined length of time. A capacitor and potentiometer are placed in parallel across the device or circuit to be tested. When there is no open circuit the capacitor and the potentiometer are shorted and carry no current. When an open circuit occurs the capacitor begins to charge and the current through the potentiometer increases exponentially. The output signal from the potentiometer is taken from the wiper, which can be adjusted to give the desired output signal level. The wiper is connected to a current or voltage control device which is connected to an indicator. The indicator produces a visible or audible output signal that indicates the presence or absence of current therethrough. The output signal from the wiper of the potentiometer switches the control device to its alternate state and the indicator then produces its output signal.

The invention can also be used to test for high impedance of a load that normally would have a low impedance. For example, the load could be a resistor that normally would not have sufficient resistance to cause the current flow through the potentiometer to be great enough to switch the control device. If the resistor is damaged from vibration, heat, etc., its resistance can become substantially larger. By adjusting the wiper setting on the potentiometer, the circuitry of this invention can sense this larger resistance in the damaged resistor from the larger current through the potentiometer. The circuitry of this invention can also sense broken connectors, solder joints, leads, etc.

It is an object of this invention, therefore, to provide a sensor that detects open circuits.

It is another object of this invention to provide a sensor that senses whether a circuit or device is in a high impedance or a low impedance condition.

It is another object of this invention to provide a relay contact chatter detector that is simple and less costly than prior art units.

It is another object of this invention to provide a relay contact chatter detector that detects contacts that are open for longer than a predetermined time.

These and other objects of this invention will become apparent from a reading of the following specification and appended claims in conjunction with the accompanying drawing which is a schematic diagram of a preferred embodiment of this invention.

Referring now to the drawing, there is shown a pair of input calibration terminals 10 and 12. Input terminal 10 is connected to input terminal 12 by means of an impedance means or resistor 14. Input terminal 10 is further connected to one end of an impedance means or resistor 16. The other end of resistor 16 is connected to one end of a switch 18. The other end of switch 18 is connected to a conductor or lead 20 and is further connected by a voltage control means or a Zener diode 22 to the input terminal 12. Resistors 14 and 16 comprise an impedance matching circuit for calibration input. Input terminal 12 is further connected by means of a lead or conductor 24 to the negative terminal of a potential source or battery 26. Conductor 24 shall henceforth be referred to as a first reference potential, which in some instances may be ground. The Zenor diode 22 is polarized such that conductor 20 cannot become more than a predetermined potential above conductor 24. This predetermined potential is called the breakdown or zenering voltage of the Zener diode 22, and it is a characteristic of the particular Zener diode chosen.

The positive terminal of the battery 26 is connected by a series combination of a fuse or current regulator 28 and a reset switch 30 to a junction point 32. The junction point 32 is further connected by means of a series combination of an impedance means or resistor 34 and a switch 36 to the conductor 20.

An impedance means or resistor 38 is connected between conductor 20 and a terminal 40. The terminal 40 is further connected to a terminal 42 by means of a parallel combination of a capacitor 44 and a resistance element of a voltage divider or potentiometer generally designated as 46. For ease of explanation the resistance element of potentiometer 46 is shown having two variable resistance portions 47 and 49 with resistance portion 47 connected to terminal 40 and resistance portion 49 connected to terminal 42. The capacitor 44 and the resistance element of the potentiometer 46 can be considered as an impedance or time delay means. Terminal 42 is further connected to the first reference potential 24. Potentiometer 46 also has an output means or wiper 48. Junction point 32 is connected to one end of a signal means or indicator means, which in this drawing is shown as an incandescent lamp 50. The other end of the lamp 50 is connected to a first output electrode or anode 52 of a switching means or current control means, which is shown as a silicon controlled rectifier (SCR) 54. The SCR 54 further has a second output electrode or a cathode 56 connected to the first reference potential 24 and a control electrode or gate 58 is connected to the wiper 48 of the potentiometer 46.

An actuating coil 66 of a load means or relay 60 is connected between a terminal 68 and a second reference potential or ground 70. A stationary contact 62 of relay 60 is connected to the terminal 42 and a movable contact 64 of relay 60 is connected to the terminal 40.

The movable contact 64 is connected to the actuating coil 66, by a mechanical connection represented schematically by a dashed line 72. The relay contacts 62 and 64 of the relay means 60 are connected across a load 74. The load 74 can be any desired device or circuit that the relay is to operate. While a relay means 60 is shown in the specific embodiment, the applicant desires it to be understood that the load 60 is not to be limited to a relay means. The reference numeral 60 can designate any desired device or circuit on which the invention is to be used to test for open circuits.

To calibrate the circuit, switch 36 is opened, switch 18 is closed, and relay contacts 62 and 64 of relay means 60 are opened. A voltage is then applied to the input terminals 10 and 12 such that terminal 10 is positive with respect to terminal 12. Current will flow from terminals 10, through resistor 16, switch 18, conductor 20, resistor 38, capacitor 44, and conductor 24 to terminal 12. The pulses should be of a large enough amplitude to cause the Zener diode 22 to operate in the reverse breakdown region. This current will cause the capacitor 44 to begin to charge and current will begin to flow through potentiometer 46. At some time after the voltage is applied to terminals 10 and 12 the current flow through potentiometer 46 will cause a large enough voltage drop across the resistance portion 49 to cause the SCR 54 to begin conducting. When the SCR 54 begins conducting, current will flow from the positive terminal of battery 26, through a path comprising fuse 28, switch 30, lamp 50, anode 52 of SCR 54, and cathode 56 of SCR 54 to the negative terminal of battery 26. This current flowing through incandescent lamp 50 will cause the lamp 50 to glow, thus providing a visible output signal showing that the SCR 54 is conducting.

If it is desired to set the circuit to detect relay contact openings of more than a certain length of time, pulses of the desired length are applied to the input terminals 10 and 12. For example, if contact openings of longer than 10 microseconds cannot be tolerated then 10 microsecond pulses are applied to input terminals 10 and 12. The amplitude of the pulses will be large enough to cause the Zener diode 22 to operate in the reverse breakdown region, so that the potential difference between conductors 20 and 22 is closely regulated. When a pulse occurs at terminals 10 and 12, the capacitor 44 will begin to charge as described above and current will flow through the resistance portions 47 and 49 of potentiometer 46. If the wiper 48 is set so that resistance portion 49 is very small, the current flowing through the potentiometer will not produce a large enough voltage drop across resistance portion 49 to gate or switch the SCR 54 ON before the pulse ends. When the pulse ends the capacitor 44 will discharge through the resistance element of potentiometer 46. Now if the wiper 48 of the potentiometer 46 is slowly moved so that resistance portion 47 is decreasing and resistance portion 49 is increasing each succeeding pulse applied to input terminals 10 and 12 will cause a larger voltage drop across the resistance portion 49 of the potentiometer 46. At some setting of the wiper 48 this voltage drop across resistance portion 49 will be just large enough to cause the SCR 54 to conduct. The conduction of the SCR 54 will cause the incandescent lamp 50 to glow as explained above. At this potentiometer setting the chatter detector is calibrated to detect the openings of the contacts 62 and 64 that are longer than the predetermined time, e.g., 10 microseconds.

To use the detector, the switch 18 is opened and the switch 36 is closed. If the relay contacts 62 and 64 are closed, current flows from the positive terminal of battery 26 through a path comprising fuse 28, switch 30, resistor 34, switch 36, resistor 38, relay contact 64, and relay contact 62 to the negative terminal of battery 26. As may be determined, potentiometer 46 is shorted by the relay contacts 62 and 64 and no current flows through it.

The SCR 54 therefore remains OFF or nonconducting since wiper 48 is essentially at the potential of lead 24, hence, the lamp 50 will not glow.

When the relay contacts 62 and 64 open for less than the predetermined time, the capacitor 44 begins to charge as soon as the contacts 62 and 64 are open. As the capacitor 44 charges, more current flows through resistance portions 47 and 49 of potentiometer 46, but before the critical value of current flow through resistance portion 49 is reached, the contacts 62 and 64 close thereby shorting capacitor 44 and potentiometer 46 so that the current flow through resistance portion 49 ceases. The critical value of current flow through resistance portion is defined as that amount of current flowing through resistance portion 49 which will just cause SCR 54 to conduct. Thus, in this case when the contacts 62 and 64 are open less than the predetermined time the SCR 54 will not conduct and the lamp 50 will not glow.

When the relay contacts 62 and 64 open for more than the predetermined time, the capacitor 44 begins charging as soon as the contacts 62 and 64 open. When the predetermined time has lapsed the critical value of current through resistance portion 49 of potentiometer 46 has been reached and the SCR 54 will be gated or switched ON or to a conducting condition. The conduction of the SCR 54 causes current to flow through the lamp 50 which causes the lamp 50 to glow. The glowing of lamp 50, therefore, indicates that the relay contacts 62 and 64 of relay means 60 have opened for more than the predetermined time.

To reset the detector when SCR 54 is of the type that remains ON when the control signal at gate 58 disappears, the reset switch 30 must be opened thereby interrupting all current flow. The capacitor 44 discharges and the SCR 54 ceases to conduct thereby stopping the current flow through lamp 50. When the reset switch 30 is released, the detector will repeat the operation described hereinbefore.

While the operation of the invention has been described with the relay contacts 62 and 64 either being open or closed, it is not necessary for terminals 40 and 42 to either have a short or an open circuit between them. The invention can be used to differentiate dirty or pitted relay contacts that have an appreciable resistance between them from clean contacts that have very little resistance. Also, in many applications the load 74 may shunt the contacts 62 and 64 with an impedance so that there is never a true open circuit between terminals 40 and 42. The load impedance between terminals 40 and 42 will then be either a low impedance when the contacts 62 and 64 are closed or a high impedance when the contacts 40 and 42 are open. By adjusting the wiper 48 on the potentiometer 46 the SCR 54 can be held OFF by the gate 58 when the contacts 62 and 64 are closed and can be switched ON when the contacts 62 and 64 are open and the impedance between terminals 40 and 42 increases.

While only a specific embodiment is described to illustrate the invention it is to be understood that this description is made only by way of example and not as a limitation on the scope of the invention. For example, the relay means 60 can be any device or circuit that it is desired to test with this invention and lamp means 50 can be any device to indicate the presence or absence of current flow therethrough. These and other modifications will be apparent to those skilled in the art. Therefore, the application intends to be limited only by the scope and language of the claims.

I claim as my invention:

1. A relay contact chatter detector comprising, in combination:

a first reference potential means;

a second reference potential means;

Zener diode means connected between said first and said second reference potential means and operable to establish a fixed second reference potential with respect to the potential of said first reference potential;

first, second and third resistive means, said first and second resistive means being connected serially between said first and second reference potential means;

relay means including a stationary contact and a movable contact, said movable contact having an open position and a closed position;

means connecting said relay means across said second resistive means;

capacitive means connected between said stationary contact and said movable contact, said capacitive means receiving a charge when said movable contact is in said open position;

first, second, and third switching means each having an open position and a closed position, said first switching means being normally in said closed position;

direct current power supplying means;

means connecting said first and second switching means, said direct current power supplying means, and said third resistive means in a series circuit between said first and second reference potential means;

controlled rectifier means having an anode, a cathode, and a control means, said controlled rectifier means normally being in a nonconductive condition;

means connecting said cathode to said first reference potential means;

mechanically adjustable means connected to said second resistive means and further connected to said control means, the potential of said mechanically adjustable means being a predetermined fraction of the potential across said second resistive means, said potential across said second resistive means being indicative of said charge on said capacitive means, and said potential of said mechanically adjustable means causing said controlled rectifier means to switch to a conducting condition after said movable contact is in said open position for a predetermined time;

incandescent lamp means;

means connecting said controlled rectifier means, said incandescent lamp means, said first switching means, and said direct current power supplying means in a series circuit so that incandescent lamp means provides a visible output signal when said controlled rectifier means is conducting current, and said first switching means operable in said open position to interrupt said current flow through said controlled rectifier means;

calibration means including fourth and fifth resistive means, said fourth and fifth resistive means comprising an impedance matching means;

means serially connecting said third switching means and said impedance matching means between said first and second reference potential means, said third switching means operable in said closed position to complete a circuit between said first and second reference potential means; and input means connected across said fourth resistive means and operable to receive a calibration signal of predetermined length voltage pulses.

References Cited

Electronics (Kopp), vol. 33, #21, May 20, 1960, pages 94-95.

RUDOLPH V. ROLINEC, *Primary Examiner.*

ARCHIE R. BORCHELT, *Examiner.*

EDWARD L. STOLARUN, *Assistant Examiner.*